United States Patent [19]
Hirata et al.

[11] Patent Number: 5,213,862
[45] Date of Patent: May 25, 1993

[54] OPTICAL RECORDING DISK

[75] Inventors: Hideki Hirata; Osamu Murakami; Toshifumi Tanaka, all of Nagano, Japan

[73] Assignee: TDK Corporation, Tokyo, Japan

[21] Appl. No.: 804,587

[22] Filed: Dec. 10, 1991

[30] Foreign Application Priority Data

Dec. 28, 1990 [JP] Japan .................. 2-418747

[51] Int. Cl.$^5$ .................. B32B 3/00
[52] U.S. Cl. .................. 428/64; 428/65; 428/913; 346/76 L; 346/135.1; 430/945
[58] Field of Search .................. 428/64, 65, 913; 346/76 L, 135.1; 430/945

[56] References Cited

FOREIGN PATENT DOCUMENTS 63-43910 2/1988 Japan .................. 428/64

Primary Examiner—Patrick J. Ryan
Assistant Examiner—Elizabeth Evans
Attorney, Agent, or Firm—Watson, Cole, Grindle & Watson

[57] ABSTRACT

An optical recording disk is constructed using an injection molded substrate of a cyclic polyolefin having a recurring structural unit of the formula:

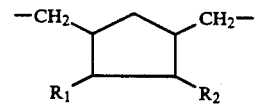

wherein $R_1$ and $R_2$ are independently selected from hydrocarbon groups. The disk has a diameter of at least 200 mm, and is rotated at 1,800 rpm or higher during recording/reproducing operation. Despite a larger diameter, the disk experiences minimized occurrence of double refraction during high speed rotation, ensuring high outputs with a high C/N and a low noise level.

3 Claims, No Drawings

OPTICAL RECORDING DISK

BACKGROUND OF THE INVENTION

1. Field of the Invention

This invention relates to optical recording disks including magneto-optic recording disks, phase change type optical recording disks, and pit-formation type optical recording disks.

2. Prior Art

Optical recording disks each have a recording layer formed on a substrate, and are generally recorded and reproduced by directing a laser beam or similar light through the substrate. Therefore, the substrates used are formed of transparent materials, for example, glass and resins. For a weight reduction and ease of formation of tracking grooves and pits, conventional optical recording disks use resinous substrates with polymethyl methacrylate and polycarbonate being frequently employed.

Among them, polymethyl methacrylate has excellent optical properties including a low coefficient of optical elasticity and a very low double refraction or birefringence, but is poor in dimensional stability due to high water absorption and low heat resistance. Therefore, polycarbonates having low water absorption and relatively high heat resistance are used most often.

SUMMARY OF THE INVENTION

However, the polycarbonates have a high coefficient of optical elasticity and often a high double refraction since their polymer chain tends to orient in a flow direction. For achieving a higher recording density and higher transfer rate, it was attempted in recent years to use disks of a larger diameter of at least 200 mm and carry out recording/reproducing operation at a high number of revolutions of at least 1,800 rpm. In such large diameter substrates, double refraction is incurred during injection molding which is further increased through application of stresses during high speed rotation, resulting in a lowering of reproduced outputs.

Water absorption is not fully low and large size substrates will undergo substantial distortion. In addition, solvent resistance is insufficient when recording layers of the coating type are applied.

A primary object of the invention is to provide an optical recording disk using a resin substrate having improved dimensional stability and solvent resistance which ensures sufficient outputs and C/N even when the disk is large sized and operated at a high rotational speed.

This and other objects are achieved in accordance with the present invention by an optical recording disk comprising a substrate formed of a cyclic polyolefin having a recurring structural unit of the following formula and having a diameter of at least 200 mm, and a recording layer on the substrate, wherein recording/reproducing operation is carried out while rotating the disk at a number of revolutions of at least 1,800 rpm.

Formula:

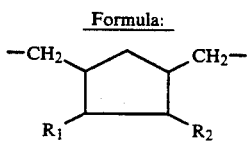

In the formula, $R_1$ and $R_2$ are independently selected from hydrocarbon groups.

Preferably, the cyclic polyolefin has a number average molecular weight of 10,000 to 100,000, and the substrate is formed by injection molding the cyclic polyolefin.

ILLUSTRATIVE CONSTRUCTION

The illustrative construction of the present invention is now described.

The substrate used in the present invention is formed of a cyclic polyolefin having a recurring structural unit of the above-defined formula. In the formula, $R_1$ and $R_2$ are hydrocarbon groups, preferably unsubstituted alkyl groups having 1 to 5 carbon atoms.

The cyclic polyolefins used are preferably homopolymers consisting of recurring units of the formula although copolymers comprising recurring units of the formula wherein $R_1$ and $R_2$ are different. They preferably have a number average molecular weight of from 10,000 to 100,000, especially from 20,000 to 50,000. The cyclic polyolefins may be obtained by polymerization in accordance with conventional techniques or commercially available ones such as Zeonex 280 from Nippon Zeon K.K. may be used.

The cyclic polyolefins can be formed into substrates by injection molding. Upon injection molding, the melting temperature is about 300° to 400° C., the mold temperature is about 80° to 120° C., the injection pressure is about 300 to 400 kg/cm$^2$, and the remaining conditions including holding pressure and clamping force are as usual.

The substrates obtained by injection molding should have a diameter of at least 200 mm. Substrates having a diameter of less than 200 mm provide no substantial difference from polycarbonate substrates injection molded under optimum conditions, and do not manifest the benefits of output increase and noise reduction according to the invention.

By contrast, substrates having a larger diameter of at least 200 mm manifest a C/N improvement by 2 to 5 dB or more and a noise reduction. No particular upper limit is imposed on the substrate diameter although it is generally up to about 380 mm.

The substrates are about 1.0 to 1.5 mm thick. The substrates on the surface may be provided with a pattern in the form of grooves and pits carrying pre-format information. The substrates may be integrally formed with hubs in which glass fibers may be incorporated for preventing crazing and cracking.

A recording layer is formed on the substrate directly or through a suitable undercoat layer or intermediate layer. Various optical recording disk structures are completed by forming a protective layer, reflective layer or the like on the recording layer, if necessary.

The optical recording disks include magneto-optic recording disks in which information is magnetically recorded by a modulated thermal beam or modulated magnetic field and reproduced through magneto-optic conversion;

erasable disks such as optical recording disks having a phase change type recording layer wherein information is recorded and reproduced by way of a change in reflectivity; and write-once disks such as optical recording disks of the air sandwich structure having a pit-formation type recording layer in which pit formation results in a change of reflectivity and optical recording disks additionally having a reflective layer corresponding to the laser disk (LD) standard.

The optical recording disks are rotated at a number of revolutions of at least 1,800 rpm while recording/reproducing operation is carried out. With a number of revolutions of lower than 1,800 rpm, the benefits of output increase and noise reduction according to the invention are not manifested. The upper limit of the number of revolutions is generally about 5,400 rpm and the rotating system may be either CAV or CLV.

EXAMPLE

Specific examples of the present invention are given below by way of illustration.

EXAMPLE 1

There were prepared pellets of a cyclic polyolefin having recurring units of the above-defined formula wherein $R_1=R_2=$ethyl, that is, 1,4-dimethylene-2,3-diethylcyclopentane, and a number average molecular weight of 29,000. The pellets were melted at 350° C. and injection molded into substrates having a diameter of 300 mm and a thickness of 1.2 mm at a mold temperature of 100° C. under an injection pressure of 350 kg/cm$^2$.

The substrates each were successively provided with a protective layer of glass, an intermediate layer of SiNx, a recording layer of TbFeCo, an intermediate layer of SiNx, and a resinous protective coat. Finally, a pair of substrates were mated and joined with an adhesive such that the recording layers faced each other, completing a magneto. optic recording disk of the double side recording type. The substrates on the surface were formed with tracking grooves.

While the disk was rotated at 3,600 rpm, signals were recorded at a recording frequency of 10 MHz and then reproduced for measuring a C/N ratio and noise level at a position of 175 mm in diameter (linear speed 33 m/s) and a position of 130 mm in diameter (linear speed 24 m/s). The results are shown in Table 1.

TABLE 1

| Diameter 300 mm, 3,600 rpm | | |
|---|---|---|
| | Cyclic polyolefin | Polycarbonate |
| C/N (dB) | | |
| 130 mm diameter | 54 | 50 |
| 175 mm diameter | 58 | 54 |
| Noise level (dB) | | |
| 130 mm diameter | −74 | −73 |
| 175 mm diameter | −76 | −74 |

For comparison purposes, Table 1 also reports the results of bisphenol-A type polycarbonate (number average molecular weight 15,000) which was injection molded under optimum conditions: melting temperature 340° C., mold temperature 100° C., and injection pressure of 300 kg/cm$^2$.

For substrates sized 130 mm in diameter, an additional comparison was made between the cyclic polyolefin and the polycarbonate. With a number of revolutions of 1,800 rpm and a recording frequency of 3.7 MHz, a C/N ratio and noise level were measured at a position of 60 mm in diameter (linear speed 5.7 m/s). The results are shown in Table 2.

TABLE 2

| Diameter 130 mm, 1,800 rpm | | |
|---|---|---|
| | Cyclic polyolefin | Polycarbonate |
| C/N (dB) | | |
| 60 mm diameter | 46 | 46 |
| Noise level (dB) | | |
| 60 mm diameter | −48 | −48 |

As seen from the data of Tables 1 and 2, the cyclic polyolefin substrates according to the invention show a critical improvement in C/N and a critical lowering of noise level when they have a diameter of at least 200 mm and operated at a higher number of revolutions of at least 1,800 rpm.

BENEFITS OF THE INVENTION

The cyclic polyolefins according to the invention have a low coefficient of optical elasticity, manifest little double refraction even when injection molded to a larger diameter of at least 200 mm, and experience no increase of double refraction under application of stresses during high speed rotation at 1,800 rpm or more, ensuring high outputs with a high C/N and a low noise level.

Minimized water absorption leads to minimized distortion even at a large size of at least 200 mm in diameter, thus ensuring high mechanical precision. Satisfactory solvent resistance and moldability eliminate the risk of cracking.

We claim:

1. An optical recording disk comprising a substrate formed of a cyclic polyolefin having a recurring structural unit of the formula:

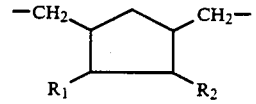

wherein $R_1$ and $R_2$ are independently selected from hydrocarbon groups, and having a diameter of at least 200 mm, and a recording layer on the substrate, wherein recording/reproducing operation is carried out while rotating the disk at a number of revolutions of at least 1,800 rpm.

2. The optical recording disk of claim 1 wherein said cyclic polyolefin has a number average molecular weight of 10,000 to 100,000.

3. The optical recording disk of claim 1 or 2 wherein said substrate is formed by injection molding said cyclic polyolefin.

* * * * *